No. 812,085. PATENTED FEB. 6, 1906.
W. J. PAYETTE.
PLOW ATTACHMENT.
APPLICATION FILED JAN. 23, 1905.
2 SHEETS—SHEET 1.
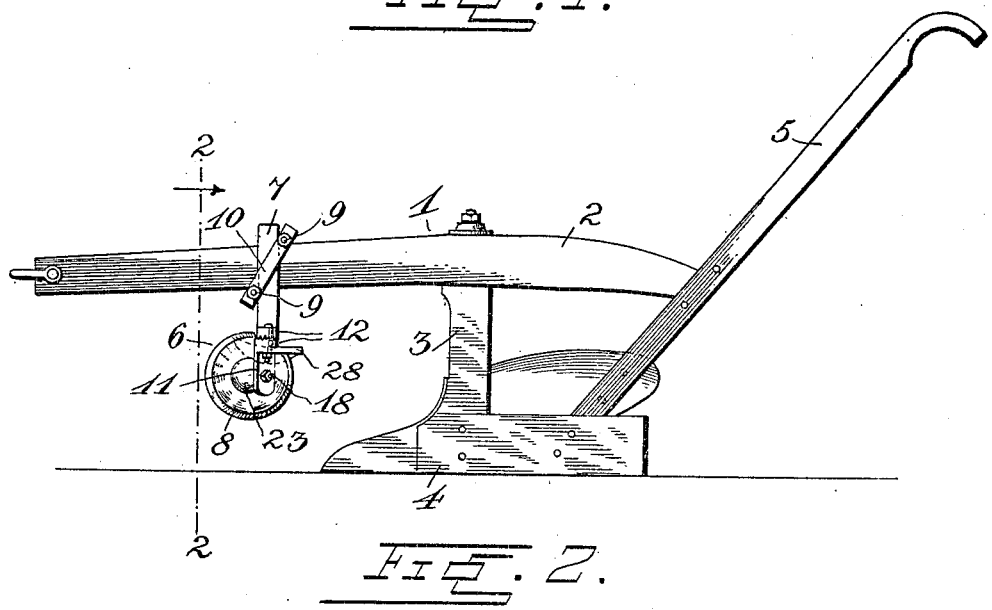
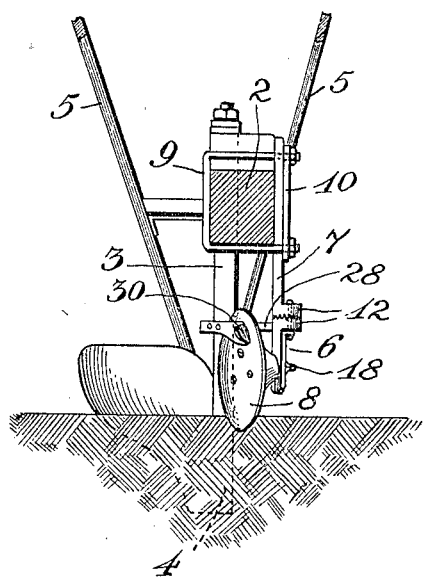
Witnesses
Inventor
William J. Payette
by H. R. Willson
Attorney

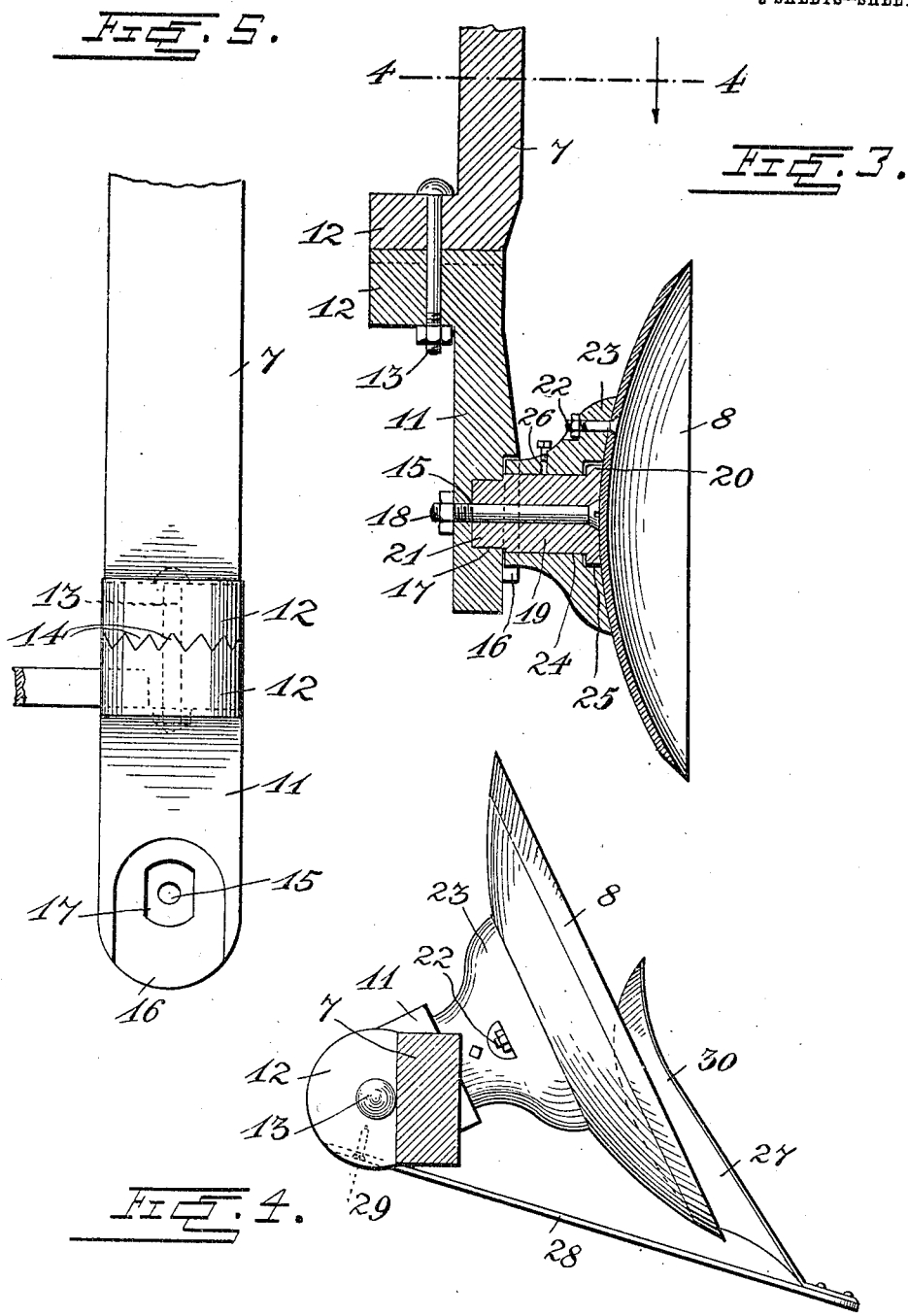

UNITED STATES PATENT OFFICE.

WILLIAM JOHN PAYETTE, OF CENTRALIA, WASHINGTON.

PLOW ATTACHMENT.

No. 812,085. Specification of Letters Patent. Patented Feb. 6, 1906.

Application filed January 23, 1905. Serial No. 242,316.

*To all whom it may concern:*

Be it known that I, WILLIAM JOHN PAYETTE, a citizen of the United States, residing at Centralia, in the county of Lewis and State of Washington, have invented certain new and useful Improvements in Plow Attachments; and I do declare the following to be a full, clear, and exact description of the invention, such as will enable others skilled in the art to which it appertains to make and use the same.

My invention relates to improvements in disk jointers for plows; and it consists in certain novel features of construction, combination, and arrangement of parts hereinafter described and claimed.

One object of my invention is to provide a simple, durable, and inexpensive plow attachment of this character which will cut and turn a small furrow on the side next to the landside of the plow in advance of the large furrow made by the plow, so that the weeds and the seeds of the latter will be buried deep in the bottom of the furrow in order to give the grain a chance to grow before the weeds sprout.

Another object of my invention is to provide a simple inexpensive cleaning device for the cutting-disk of a jointer The above and other objects, which will appear as the nature of my invention is better understood, are accomplished by the construction illustrated in the accompanying drawings, in which—

Figure 1 is a side elevation of a plow with my improved attachment applied thereto. Fig. 2 is a vertical transverse sectional view taken on the line 2 2 of Fig. 1. Fig. 3 is a vertical longitudinal sectional view through the attachment. Fig. 4 is a horizontal sectional view taken on the line 4 4 in Fig. 3, and Fig. 5 is a side elevation of the adjustable disk-carrying arm of the device.

Referring to the drawings by numeral, 1 denotes a plow of ordinary construction comprising a beam 2, standard 3, a plowshare 4, and a handle 5, and 6 denotes my improved disk jointer, which, as illustrated, is in the form of an attachment removably secured or clamped upon the front portion of the plow-beam 2. The device 6 comprises a standard 7 and a rotary disk cutter 8, which is adjustably mounted upon said standard, and it is adapted to be clamped upon the plow-beam, so that it will cut a small strip of soil about two or three inches deep and four or five inches broad on the side next to the landside of the plow and in advance of the large furrow made by the plowshare 4. As shown, the standard 7 is in the form of a straight bar of metal and is clamped in a vertical position upon one side of the beam 2 by a U-shaped bolt 9, passed around said beam and through openings formed in a clamping-plate 10, which engages said standard 7; but it will be understood that the latter may be adjustably secured to the beam in any other suitable manner.

The rotary disk cutter 8 is journaled upon an arm 11, which is angularly or radially adjustable upon the standard 7. This adjustment is preferably effected by forming upon the lower end of the standard 7 and the upper end of the arm 11 circular heads 12, which are pivotally connected by a bolt 13, passed through centrally-disposed alining openings formed in said heads. The contacting faces of said heads are formed with radially-disposed grooves or corrugations 14, which prevent them from turning upon each other when clamped in an adjusted position by the bolt 13. In the lower end of the arm 11 is formed a transversely-disposed opening 15, a longitudinally-extending slot 16, and a substantially rectangular recess 17, which is disposed in said slot in alinement with said openings, as clearly shown in Fig. 5 of the drawings. The opening 15 is adapted to receive a bolt or pin 18, which extends through a journal-sleeve 19, upon which the rotary disk cutter 8 is mounted. The said sleeve 19 is cylindrical in form and has at its outer end an annular flange 20 and at its inner end a substantially rectangular reduced portion 21, which is adapted to fit the recess 17 to prevent said sleeve from rotating. The cutter-disk 8, which is dished or concave, as shown, is secured by means of bolts 22 upon the concave outer face of its hub 23. The latter has a centrally-disposed bore 24, adapted to receive the journal-sleeve 19, and an annular concentrically-disposed enlarged recess 25, formed at the outer end of said bore 24 and adapted to receive the flange 20 upon the journal-sleeve 19. The hub 23 is thus mounted to rotate freely upon the sleeve 19 and is retained thereon by the flange 20. A covered oil-passage 26 may be provided in the hub for the purpose of lubricating the sleeve 19. It will be seen that by means of this construction dirt will be prevented from entering between the hub and the journal-sleeve, the disk 8 excluding it at one end and the projection of the reduced end 26 of the hub into the slot 16 in the arm 11 preventing it at the other end.

In order to keep the rotary cutter-disk clean, so that it may perform efficient work, I provide a cleaning device 27, the latter comprising an angularly-projecting bar 28, which is secured by one or more screws or bolts 29 upon the heads 12 of the arm 11, and a scraper-blade 30, which is secured upon the outer end of said bar and is adapted to engage the outer concave face of the cutter-disk 8, as clearly shown in Figs. 2 and 4 of the drawings. It will be seen that as the disk 8 is rotated the blade 30 will move any earth which clings to its concave face.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

A plow having its beam projecting laterally landward beyond the land-side plane of the share and standard, a jointer comprising a standard attached to and depending from the land-side face of the beam, an arm connected end to end to the lower end of the standard for axial movement, and a rotary disk cutter journaled on said arm and disposed on that side thereof which is opposed to the land-side plane of the plow, the lower edge of the disk cutter being disposed without the land-side plane of the plow to cut and turn a shallow, narrow furrow on the side next to the land side of the plow and in advance of, to the land side of, and out of line with, the large furrow made by the plow, substantially as described.

In testimony whereof I have hereunto set my hand in presence of two subscribing witnesses.

WILLIAM JOHN PAYETTE.

Witnesses:
 ALBERT SMITH,
 FRED E. DAVIS.